(12) United States Patent
Kani

(10) Patent No.: US 9,197,779 B2
(45) Date of Patent: Nov. 24, 2015

(54) IMAGE FORMING APPARATUS AND IMAGE FORMING SYSTEM

(71) Applicant: KYOCERA Document Solutions Inc., Osaka (JP)

(72) Inventor: Mamoru Kani, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/010,796

(22) Filed: Aug. 27, 2013

(65) Prior Publication Data

US 2014/0063523 A1 Mar. 6, 2014

(30) Foreign Application Priority Data

Aug. 31, 2012 (JP) .................................. 2012-191775

(51) Int. Cl.
H04N 1/00 (2006.01)

(52) U.S. Cl.
CPC ....... *H04N 1/00954* (2013.01); *H04N 1/00281* (2013.01); *H04N 1/00307* (2013.01); *H04N 1/00323* (2013.01); *H04N 1/00832* (2013.01); *H04N 1/00973* (2013.01)

(58) Field of Classification Search
None
See application file for complete search history.

(56) References Cited

U.S. PATENT DOCUMENTS

| | | | | |
|---|---|---|---|---|
| 5,812,780 A | * | 9/1998 | Chen et al. ..................... | 709/224 |
| 7,016,061 B1 | * | 3/2006 | Hewitt .......................... | 358/1.15 |
| 7,054,899 B1 | * | 5/2006 | Yamamoto ..................... | 709/202 |
| 7,454,458 B2 | * | 11/2008 | Islam et al. .................... | 709/203 |
| 7,844,129 B2 | * | 11/2010 | Namikata et al. ............. | 382/284 |
| 8,600,289 B1 | * | 12/2013 | Hillier et al. .................. | 434/350 |
| 2001/0030692 A1 | * | 10/2001 | Yoneda ......................... | 348/207 |
| 2004/0230974 A1 | * | 11/2004 | Hamilton et al. ............. | 718/100 |
| 2005/0068562 A1 | * | 3/2005 | Ferlitsch ....................... | 358/1.14 |
| 2007/0019228 A1 | * | 1/2007 | Rai et al. ...................... | 358/1.15 |
| 2007/0165266 A1 | * | 7/2007 | Tian ............................. | 358/1.15 |

(Continued)

FOREIGN PATENT DOCUMENTS

| | | |
|---|---|---|
| JP | 2001-298694 A | 10/2001 |
| JP | 2004-333625 A | 11/2004 |
| JP | 2005-020126 A | 1/2005 |

OTHER PUBLICATIONS

Notice of Rejection mailed by Japan Patent Office on Jul. 29, 2014 in the corresponding Japanese patent application No. 2012-191775—4 pages.

*Primary Examiner* — Ted Barnes
(74) *Attorney, Agent, or Firm* — Knobbe, Martens, Olson & Bear LLP

(57) ABSTRACT

An image forming apparatus includes a function performance information storage section, a function performance information receiving section, and a function selection section. The function performance information storage section stores function performance information of the image forming apparatus. The function performance information receiving section receives the function performance information of the mobile terminal. The function selection section compares the function performance information of the image forming apparatus with the function performance information of the mobile terminal to select the function for which the performance of the image forming apparatus is determined to be superior. The image forming apparatus transmits the information representing the function which is not selected by the function selection section to the mobile terminal, and performs the processing of the function selected by the function selection section.

7 Claims, 7 Drawing Sheets

(56) References Cited

U.S. PATENT DOCUMENTS

| | | | |
|---|---|---|---|
| 2008/0239367 A1* | 10/2008 | Podl | 358/1.15 |
| 2009/0037605 A1* | 2/2009 | Li | 709/246 |
| 2009/0067726 A1* | 3/2009 | Erol et al. | 382/197 |
| 2009/0070415 A1* | 3/2009 | Kishi et al. | 709/203 |
| 2009/0165012 A1* | 6/2009 | Corona | 718/105 |
| 2010/0161282 A1* | 6/2010 | Bell et al. | 702/186 |
| 2011/0060994 A1* | 3/2011 | Maxwell et al. | 715/730 |
| 2012/0110601 A1* | 5/2012 | Spencer et al. | 719/328 |
| 2012/0262753 A1* | 10/2012 | Viccari et al. | 358/1.15 |
| 2013/0063763 A1* | 3/2013 | Tse et al. | 358/1.15 |

* cited by examiner

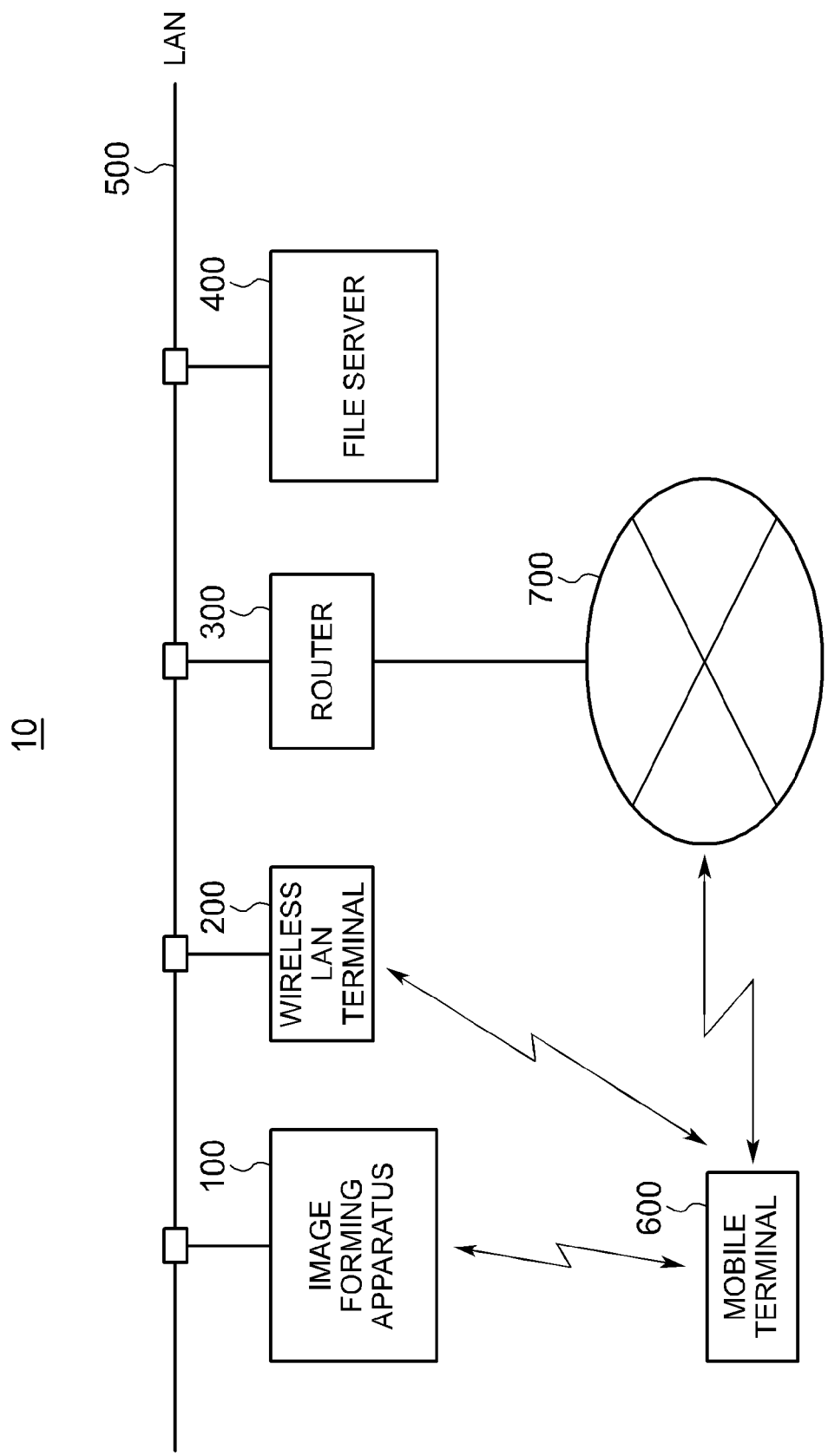

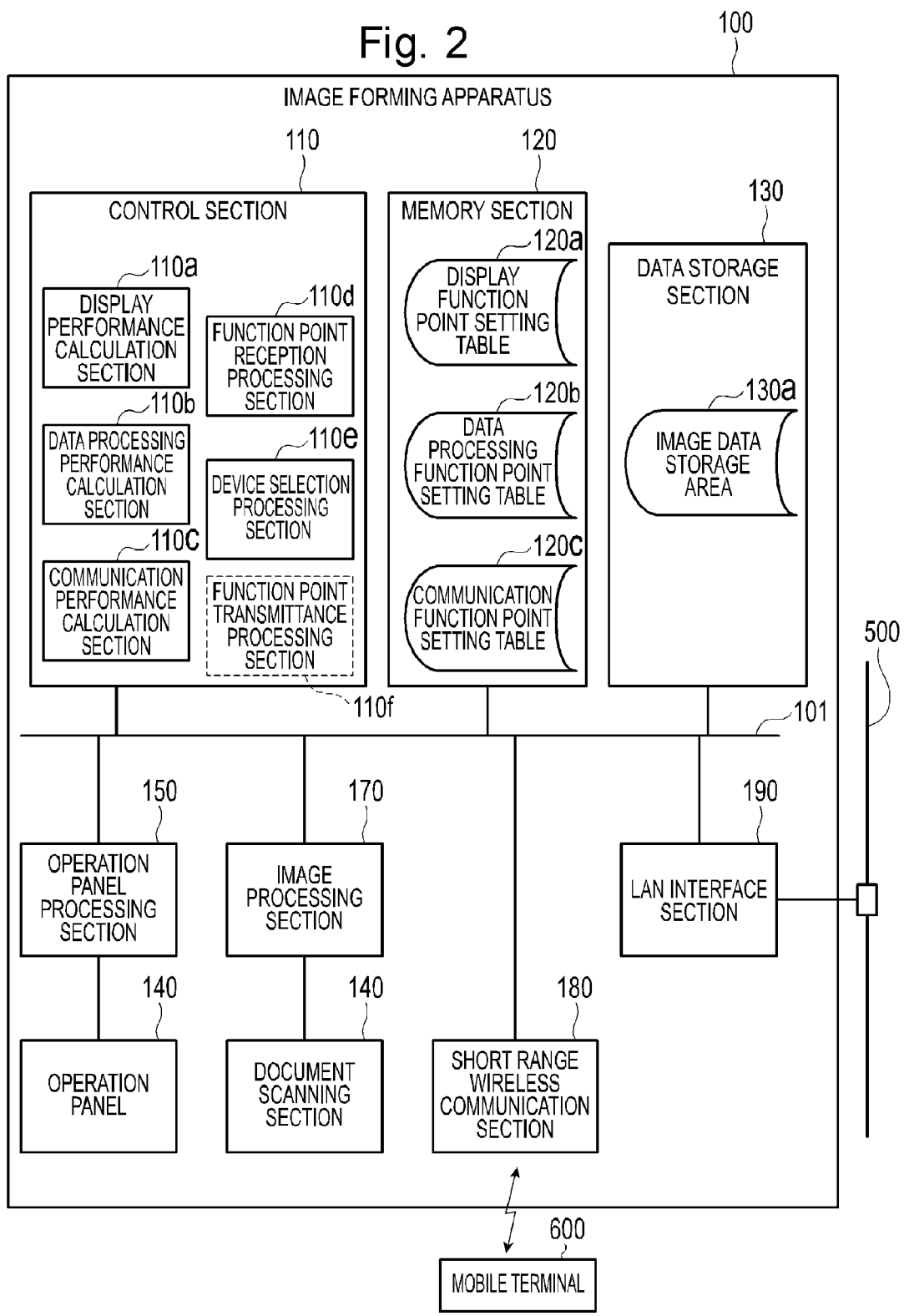

| No | Device | Display Function Element Points | | | Display Function Total Points |
|---|---|---|---|---|---|
| | | Display Resolution | Display Color | ..... | |
| 1 | Image Forming Apparatus | $a_1$ | $b_1$ | ..... | $S_{11}$ |
| 2 | Mobile Terminal | $a_2$ | $b_2$ | ..... | $S_{12}$ |

| No | DEVICE | DATA PROCESSING FUNCTION ELEMENT POINTS | | | DATA PROCESSING FUNCTION TOTAL POINTS |
|---|---|---|---|---|---|
| | | CPU PROCESSING SPEED | MEMORY FREE SPACE | ... | |
| 1 | IMAGE FORMING APPARATUS | $c_1$ | $d_1$ | ... | $S_{21}$ |
| 2 | MOBILE TERMINAL | $c_2$ | $d_2$ | ... | $S_{22}$ |

Fig.3C

| No | DEVICE | COMMUNICATION FUNCTION ELEMENT POINTS | | | COMMUNICATION FUNCTION TOTAL POINTS |
|---|---|---|---|---|---|
| | | COMMUNICATION PROCESSING SPEED | SERVER ACCESS TIME | ..... | |
| 1 | IMAGE FORMING APPARATUS | $e_1$ | $f_1$ | ..... | $S_{31}$ |
| 2 | MOBILE TERMINAL | $e_2$ | $f_2$ | ..... | $S_{32}$ |

120c

IMAGE FORMING APPARATUS AND IMAGE FORMING SYSTEM

INCORPORATION BY REFERENCE

This application claims priority to Japanese Patent Application No. 2012-191775 filed on 31 Aug. 2012, the entire contents of which are incorporated by reference herein.

BACKGROUND

The present disclosure relates to an image forming apparatus and an image forming system using a portable phone, a smart phone, or a portable terminal (hereinafter referred to as a "mobile terminal") which can operate the image forming apparatus.

An image forming apparatus, which is a multifunction peripheral (MFP), such as a printer, a multifunction printer, a multifunction peripheral apparatus, a multifunction machine, or the like can generate image data from a scanned document and document data stored in a server, perform print output, FAX transmission, and email transmission of the image data, and output the image data to the server. Further, the image forming apparatus can be operated by a mobile terminal. Lately, mobile terminals have been developed remarkably and thus mobile terminals having more excellent performance than the image forming apparatus having functions such as display, data processing, communication, and the like, embedded therein have emerged.

As such, thanks to the spread of techniques allowing mobile terminals to operate image forming apparatuses, image forming apparatuses may be easily operated by either of a body panel provided on the image forming apparatus or a mobile terminal. For example, a technique allowing a wireless terminal to perform a service operation which is performed by an operation section of the image forming apparatus to simultaneously rewrite a control program for a plurality of image forming apparatuses by establishing a one-to-many relationship between terminals and the image forming apparatus is disclosed. Further, a technique allowing a portable phone to perform an operation of a printer by using an iMode function of the portable phone and displaying status error information, and the like, of the printer on the portable phone to realize a new equipment operation unit for a panelless printer or equipment with no display section is disclosed.

SUMMARY

As an aspect of the present disclosure, a technique of further improving the above-described related art is proposed.

According to an aspect of the present disclosure, there is provided an image forming apparatus operated by a mobile terminal. The image forming apparatus includes a function performance information storage section, a function performance information receiving section, and a function selection section.

The function performance information storage section stores function performance information representing performance of a function provided in the image forming apparatus.

The function performance information receiving section receives the function performance information representing performance of a function provided in the mobile terminal from the mobile terminal.

The function selection section compares the function performance information of the image forming apparatus with the function performance information of the mobile terminal to select the function for which the performance of the image forming apparatus is determined to be superior.

In addition, the image forming apparatus transmits the information representing the function which is not selected by the function selection section to the mobile terminal, and performs the processing of the function selected by the function selection section.

Further another aspect of the present disclosure, there is provided an image forming system including a mobile terminal and an image forming apparatus operated by the mobile terminal.

The mobile terminal includes a function performance information storage section of the mobile terminal, and a function performance information transmitting section.

The function performance information storage section of the mobile terminal stores function performance information representing performance of a function provided in the mobile terminal.

The function performance information transmitting section transmits the function performance information stored in the function performance information storage section of the mobile terminal to the image forming apparatus.

The image forming apparatus includes a function performance information storage section of the image forming apparatus, a function performance information receiving section, and a function selection section.

The function performance information storage section of the image forming apparatus stores function performance information representing performance of a function provided in the image forming apparatus.

The function performance information receiving section receives the function performance information of the mobile terminal from the mobile terminal.

The function selection section compares the function performance information of the image forming apparatus with the function performance information of the mobile terminal to select the function for which the performance of the image forming apparatus is determined to be superior.

In addition, the image forming apparatus transmits information representing the function which is not selected by the function selection section to the mobile terminal, and performs the processing of the function selected by the function selection section.

Furthermore, according to another aspect of the present disclosure, there is provided an image forming system including a mobile terminal and an image forming apparatus operated by the mobile terminal.

The image forming apparatus includes a function performance information storage section of the image forming apparatus, and a function performance information transmitting section.

The function performance information storage section of the image forming apparatus stores function performance information representing performance of a function provided in the image forming apparatus.

The function performance information transmitting section transmits the function performance information stored in the function performance information storage section of the image forming apparatus to the mobile terminal.

The mobile terminal includes a function performance information storage section of the mobile terminal, a function performance information receiving section of the mobile terminal, and a function selection section of a mobile terminal side.

The function performance information storage section of the mobile terminal stores function performance information representing performance information of a function provided in the mobile terminal.

The function performance information receiving section of the mobile terminal receives function performance information representing performance of a function provided in the image forming apparatus.

The function selection section of the mobile terminal side compares the function performance information of the mobile terminal with the function performance information of the image forming apparatus to select the function for which the performance provided in the mobile terminal is determined to be superior.

In addition, the mobile terminal transmits information representing the function which is not selected by the function selection section of the mobile terminal side to the image forming apparatus, and performs the processing of the function selected by the function selection section of the mobile terminal side.

BRIEF DESCRIPTION OF THE DRAWINGS

FIG. 1 is a view illustrating a constitution example of an image forming system according to an embodiment of the present disclosure.

FIG. 2 is a view illustrating a functional constitution of the image forming apparatus according to the embodiment of the present disclosure.

FIG. 3B is a view illustrating a data processing function point setting table according to the embodiment of the present disclosure.

FIG. 3C is a view illustrating a communication function point setting table according to the embodiment of the present disclosure.

DETAILED DESCRIPTION

Figure 3A:
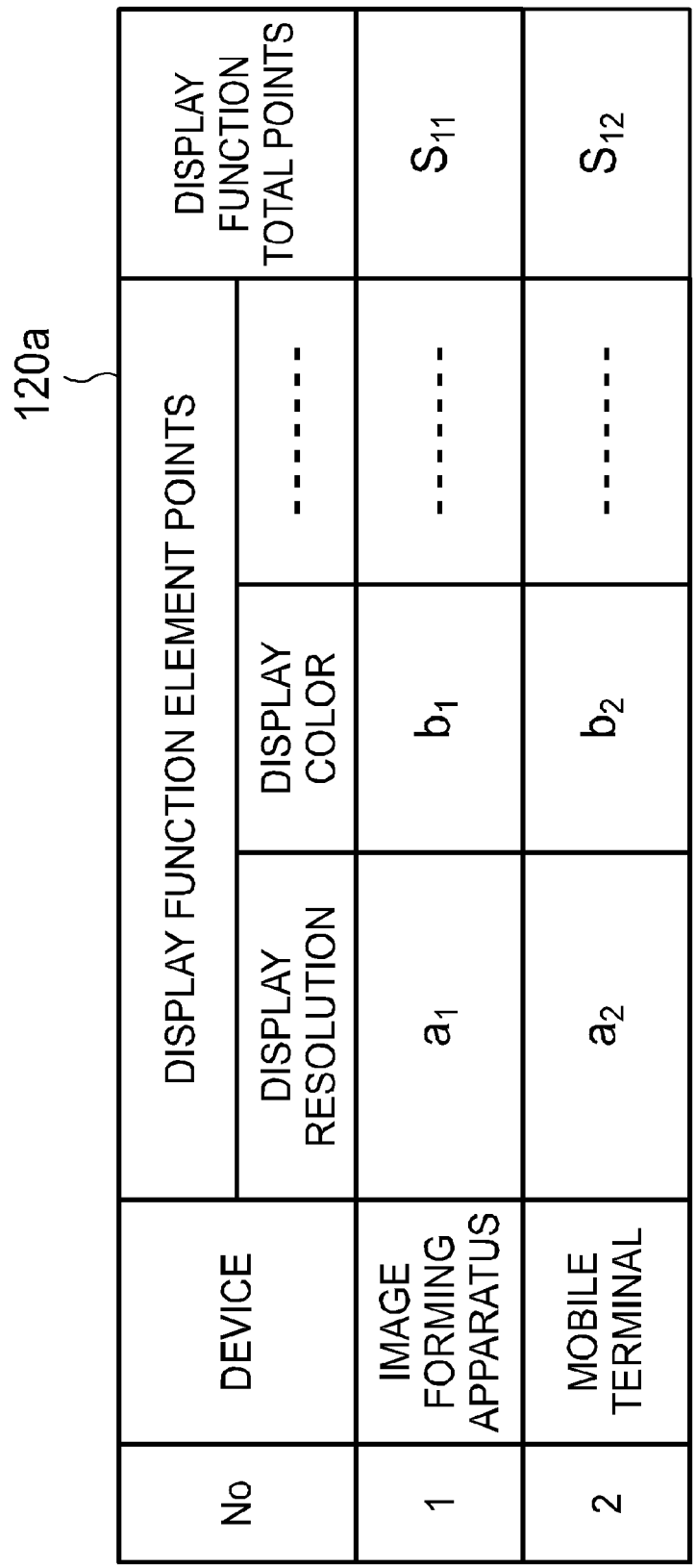
FIG. 3A is a view illustrating a constitution of a display function point setting table according to the embodiment of the present disclosure.

Hereinafter, an image forming apparatus and an image forming system according to an embodiment of the present disclosure will be described as an aspect with reference to the accompanying drawings.

An image forming system 10 illustrated in FIG. 1 according to the present disclosure includes an image forming apparatus 100 and a mobile terminal 600 provided with data processing and communication functions. The image forming apparatus 100 determines which of a body of the image forming apparatus 100 or the mobile terminal 600 for each of the display, data processing, and communication functions obtains good efficiency, in other words, improves convenience. Depending on the determined result, the image forming apparatus 100 or the mobile terminal 600 performs own function determined to be superior.

An overview of the image forming system 10 according to the present disclosure will be described with reference to FIG. 1. As illustrated in FIG. 1, the image forming system 10 includes the image forming apparatus 100, a wireless LAN terminal 200, a router 300, a file server 400, a local area network (LAN) 500, a mobile terminal 600, and the Internet 700. The image forming apparatus 100, the wireless LAN terminal 200, the router 300, and the file server 400 are connected with the LAN 500.

Next, an apparatus and equipment constituting the image forming system 10 will be described. The image forming apparatus 100 generates image data from a directly read document, document data stored in the file server 400, and the like, and outputs the generated image data or transmits designated apparatuses and equipment. The wireless LAN terminal 200 performs wireless LAN communication with the mobile terminal 600. The router 300 connects the LAN 500 with the Internet 700. Further, when the router 300 is connected with the LAN 500, the router 300 may pass through a firewall (not illustrated) to prevent unauthorized access to the image forming apparatus 100 and the file server 400 which are connected with the LAN 500 from the Internet 700. The file server 400 is a server which is provided with a disc connected with the LAN 500 that stores data files and the like that are used in the image forming system 10. The mobile terminal 600 is a portable terminal and may directly communicate with the image forming apparatus 100 within a short range by Bluetooth (registered trademark), which is a short range wireless communication standard, or infrared communication. Further, the mobile terminal 600 can wirelessly communicate with the image forming apparatus 100 via the wireless LAN terminal 200. Further, the mobile terminal 600 can be connected to the Internet 700 via a portable telephone network (not illustrated) and therefore can access the image forming apparatus 100 and the file server 400 which are connected with the LAN 500 via the router 300 from the Internet 700.

Next, main functions of the image forming apparatus 100 according to the embodiment of the present disclosure will be described with reference to FIG. 2. The image forming apparatus 100 includes a control section 110, a memory section 120, a data storage section 130, an operation panel 140, an operation panel processing section 150, a document scanning section 160, an image processing section 170, a short range wireless communication section 180, and a LAN interface section 190. The control section 110, the memory section 120, the data storage section 130, the operation panel processing section 150, the image processing section 170, the short range wireless communication section 180, and the LAN interface section 190 are connected by a bus 101. The control section 110 includes a display performance calculation section 110a, a data processing performance calculation section 110b, a communication performance calculation section 110c, a function point reception processing section 110d, and a device selection processing section 110e. The memory section 120 includes a display function point setting table 120a, a data processing function point setting table 120b, and a communication function point setting table 120c. The data storage section 130 includes an image data storage area 130a.

The control section 110 includes main memory units, such as a RAM and a ROM, and a control unit, such as a central processing unit (CPU), and the like. Further, the control section 110 performs control of a universal image forming apparatus 100 which includes interfaces, such as various I/Os and a universal serial bus (USB), a bus controller, and the like.

The display performance calculation section 110a detects the performance of elements (hereinafter referred to as a "display element") of hardware or software used at the time of realizing a function of performing the display of the operation panel 140, such as resolution and display color of the operation panel 140 of the image forming apparatus 100, calculates points for each display element and total points thereof by predetermined weighting, and sets the calculated points in the display function point setting table 120a. As the point increases, the performance becomes higher.

The data processing performance calculation section 110b detects the performance of an element (hereinafter referred to as a "data processing element") of hardware or software used at the time of realizing a function of performing generation processing of data displayed on an operation screen of the image forming apparatus 100 and a function of performing data processing in making processing of images (hereinafter referred to as a "image preview"), calculates points for each data processing element and the total points thereof by the predetermined weighting, and sets the calculated points in the data processing function point setting table 120b. As the points increase, the performance becomes higher.

The communication performance calculation section 110c detects the performance of an element (hereinafter referred to as a "communication element') of hardware or software used at the time of realizing a function of allowing the image forming apparatus 100 to communicate with the file server 400 or the mobile terminal 600, calculates points for each communication element and the total points thereof by the predetermined weighting, and sets the calculated points in the function point setting table 120c. As the points increase, the performance becomes higher.

When the function point reception processing section 110d receives points for each display element of the mobile terminal 600 and the total points thereof from the mobile terminal 600, the function point reception processing section 110d sets the received points in the display function point setting table 120a. When the function point reception processing section 110d receives points for each data processing element of the mobile terminal 600 and the total points thereof from the mobile terminal 600, the function point reception processing section 110d sets the received points in the data processing function point setting table 120b. When the function point reception processing section 110d receives points for each communication element of the mobile terminal 600 and the total points thereof from the mobile terminal 600, the function point reception processing section 110d sets the received points in the communication function point setting table 120c. The function point reception processing section 110d is an example of the function performance information receiving section in the claims.

The device selection processing section 110e for each function determines which of the image forming apparatus 100 and the mobile terminal 600 can be operated to further improve the convenience of each of the display, data processing, and communication functions based on the total points of each function which are calculated by the display performance calculation section 110a, the data processing performance calculation section 110b, and the communication performance calculation section 110c and selects the function of devices determined to have the further improved convenience. The device selection processing for each function which is executed by the device selection processing section 110e will be described later. The device selection processing section 110e is an example of the function selection section in the claims.

Further, the display performance calculation section 110a, the data processing performance calculation section 110b, the communication performance calculation section 110c, and the device selection processing section 110e performs the processing by the control section 110 at a predetermined period.

The memory section 120, which is an auxiliary memory device configured of a flash memory, and the like, stores programs and data for processing to be executed by the control section 110.

The points for each display element and the total points thereof which are calculated by the display performance calculation section 110a and the points for each display element of the mobile terminal 600 and the total points thereof which are received by the function point reception processing section 110d are set in the display function point setting table 120a.

The points for each data processing element and the total points thereof which are calculated by the data processing performance calculation section 110b and the points for each display element of the mobile terminal 600 and the total points thereof which are received by the function point reception processing section 110d are set in the data processing function point setting table 120b.

The points for each communication element and the total points thereof which are calculated by the communication performance calculation section 110c and the points for each communication element of the mobile terminal 600 and the total points thereof which are received by the function point reception processing section 110d are set in the communication function point setting table 120c.

The display function point setting table 120a, the data processing function point setting table 120b, and the communication function point setting table 120c will be described later.

Further, the display performance calculation section 110a, the data processing performance calculation section 110b, the communication performance calculation section 110c, the display function point setting table 120a, the data processing function point setting table 120b, and the communication function point setting table 120c are an example of a function performance information storage section in the claims.

The data storage section 130 is a hard disk drive which stores data and programs. The data storage section 130 includes an image data storage area 130a, and images read from a document scanning section 160 and images received from the file server 400 or the mobile terminal 600 via the LAN interface section 190 are stored in the image data storage area 130a.

The operation panel 140 receives a display of an operation screen and an operation by a user. The operation panel processing section 150 performs processing of displaying operation items of the functions provided in the image forming apparatus 100 on the operation panel 140, processing of inputting the operation of the user from the operation panel 140, processing of displaying an image preview, and the like.

When a user performs a reading operation of a document from the operation panel 140, the document scanning section 160 reads a document set on a document platen of the image forming apparatus 100, converts the read document into images, and outputs the images to the image processing section 170. When the images are input from the document scanning section 160, the image processing section 170 converts the images into data of printable images and images transmittable through FAX or email and outputs the data to the control section 110.

The short range wireless communication section 180 directly communicates with the mobile terminal 600 within a short range by Bluetooth (registered trademark), which is a short range wireless communication standard, or infrared communication.

The LAN interface section 190 is connected with the LAN 500 and the wireless LAN terminal 200, the router 300, and the file server 400 are also connected with the LAN 500. Since the wireless LAN terminal 200 wirelessly communicates with the mobile terminal 600, the image forming apparatus 100 can access the mobile terminal 600 via the LAN interface section 190 and the wireless LAN terminal 200. Since the router 300 is connected to the Internet 700, the image forming apparatus 100 can access the Internet 700 via the LAN interface section 190 and the router 300. Further, the image forming apparatus 100 can access the file server 400 via the LAN interface section 190.

Next, a constitution of the display function point setting table 120a illustrated in FIG. 3A, the data processing function point setting table 120b illustrated in FIG. 3B, and the communication function point setting table 120c illustrated in FIG. 3C will be described.

As illustrated in FIG. 3A, the display function point setting table 120a includes items of "No.," "device," "display function element point," and "display function total point." "No." is an index number attached to each device. One of "image forming apparatus" and "mobile terminal" is set in "device." For the performance for each display element in the operation panel 140, such as "display resolution" and "display color," the number of points which are converted into points by a predetermined weighting is set in "display function element point." The total number of points of "display function element point" is set in "total points."

In the display function point setting table 120a having the above constitution, when the image forming apparatus 100 of the image forming system 10 is set to "1" in "No.", "image forming apparatus" is set in "device," when the number of weight points for the performance of the display resolution is "$a_1$," "$a_1$" is set in "display resolution," and when the number of weighted points for the display color performance is "$b_1$," "$b_1$" is set in "display color."

As illustrated in FIG. 3B, the data processing function point setting table 120b includes items of "No.," "device," "data processing function point," and "data processing function total point." "No." is an index number attached to each device. One of "image forming apparatus" and "mobile terminal" is set in "device." For the performance for each data processing element in the generation processing of data displayed on the operation screen, such as "CPU processing speed" and "available memory", the construction processing of the image preview, and the like, the number of points which are converted into points by a predetermined weighting is set in "data processing function element point." The total number of points of "data processing function element point" is set in "total points."

In the data processing function point setting table 120b having the above constitution, when the mobile terminal 600 of the image forming system 10 is set to "2" in "No.", "mobile terminal" is set in "device," when the number of weighted points for the performance of the CPU processing speed is "$c_2$", "$c_2$" is set in "CPU processing speed," and when the number of weighted points for the performance of the available memory is "$d_2$", "$d_2$" is set in "available memory".

As illustrated in FIG. 3C, the communication function point setting table 120c includes items of "No.", "device," "communication function element point", and "communication function total point". "No." is an index number attached to each device. One of "image forming apparatus" and "mobile terminal" is set in "device". For the performance for each communication element in communication with the file server 400 or the mobile terminal 600 of "communication processing speed", "server access time," and the like, the number of points which are converted into points by a predetermined weighting is set in "communication function element point". The total number of points of the communication elements of "communication function element point" is set in "total points."

In the communication function point setting table 120c having the above constitution, when the image forming apparatus 100 of the image forming system 10 is set to "1" in "No.", "image forming apparatus" is set in "device", when the number of weighted points for the performance of the communication processing speed is "$e_1$", "$e_1$" is set in "communication processing speed", and when the number of weighted points for the performance of the server access time is "$f_1$", "$f_1$" is set in "server access time".

Figure 4:
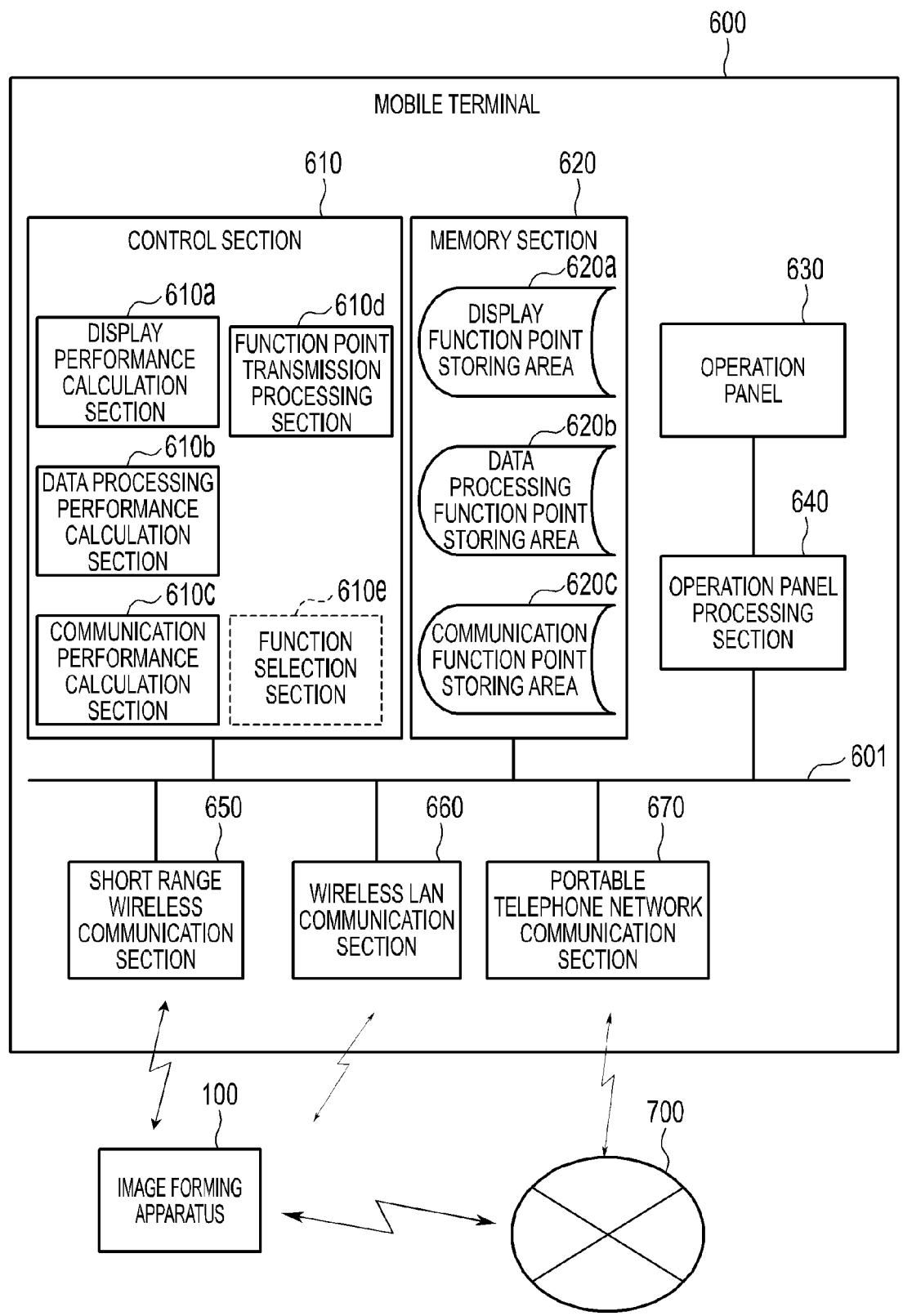
FIG. 4 is a view illustrating a functional constitution of a mobile terminal according to the embodiment of the present disclosure.

Next, main functions of the mobile terminal 600 according to the embodiment of the present disclosure will be described with reference to FIG. 4. The mobile terminal 600 includes a control section 610, a memory section 620, an operation panel 630, an operation panel processing section 640, a short range wireless communication section 650, a wireless LAN communication section 660, and a portable telephone network communication section 670. The control section 610, the memory section 620, the operation panel processing section 640, the short range wireless communication section 650, the wireless LAN communication section 660, and the portable telephone network communication section 670 are connected by a bus 601. The control section 610 includes a display performance calculation section 610a, a data processing performance calculation section 610b, a communication performance calculation section 610c, and a function point transmission processing section 610d. The memory section 620 includes a display function point storing area 620a, a data processing function point storing area 620b, and a communication function point storing area 620c.

The control section 610 includes main memory units, such as a RAM and a ROM, and a control unit, such as a central processing unit (CPU) and performs the whole control of mobile terminal 600.

Like the display performance calculation section 110a of the image forming apparatus 100, the display performance calculation section 610a detects the performance of the display element in the display of the operation panel 630 for the resolution, the display color, and the like, of the operation panel 630 of the mobile terminal 600, calculates the points for each display element and the total points thereof by the predetermined weighting, and stores the calculated points in the display function point storing area 620a.

Like the data processing performance calculation section 110b of the image forming apparatus 100, the data processing performance calculation section 610b detects the performance of the data processing element in the generation processing of the data displayed on the operation screen of the mobile terminal 600, the construction processing of the image preview, and the like, calculates the points for each data processing element and the total points thereof by the predetermined weighting, and stores the calculated points in the data processing function point storing area 620b.

Like the communication performance calculation section 110c of the image forming apparatus 100, the communication performance calculation section 610c detects the performance of the communication element in the processing of allowing the mobile terminal 600 to communicate with the file server 400 or the image forming apparatus 100, and the like, calculates the points for each communication element and the total points thereof by the predetermined weighting, and stores the calculated points in the communication function point storing area 620c.

The function point transmission processing section 610d reads the function element points and the total points of the function from the display function point storing area 620*a*, the data processing function point storing area 620*b*, and the communication function point storing area 620*c* and selects any one of communication units, such as the short range wireless communication section 650, the wireless LAN communication section 660, and the portable telephone network communication section 670, to transmit the read points to the image forming apparatus 100. As a selection order of the communication units, the function point transmission processing section 610*d* may determine whether any communication unit can communicate based on the predetermined priority and use the communication unit determined to be communicable.

Further, the each process by the display performance calculation section 610*a*, the data processing performance calculation section 610*b*, the communication performance calculation section 610*c*, and the function point transmission processing section 610*d* are performed by the control section 610 at a predetermined period.

The memory section 620, which is an auxiliary memory unit configured of a flash memory, and the like, stores programs and data which are used by the control section 610. The points for each display function element and the total points thereof which are calculated by the display performance calculation section 610*a* are stored in the display function point storing area 620*a*. The points for each data processing element and the total points thereof which are calculated by the data processing performance calculation section 610*b* are stored in the data processing function point storing area 620*b*. The points for each communication element and the total points thereof which are calculated by the communication performance calculation section 610*c* are stored in the communication function point storing area 620*c*.

Further, the display performance calculation section 610*a*, the data processing performance calculation section 610*b*, the communication performance calculation section 610*c*, the display function point storing area 620*a*, the data processing function point storing area 620*b*, and the communication function point storing area 620*c* are an example of a function performance information storage section of the mobile terminal in claims.

Further, the function point transmission processing section 610*d* is an example of a function performance information transmitting section of the mobile terminal side in claims.

The operation panel 630 receives a display of an operation screen and an operation by a user. The operation panel processing section 640 performs the processing of displaying operation items of the functions included in the mobile terminal 600 on the operation panel 630, the processing of inputting the operation of the user from the operation panel 630, the processing of displaying the image preview on the operation panel 630, and the like.

The short range wireless communication section 650 directly communicates with the image forming apparatus 100 within a short range by Bluetooth (registered trademark), which is a short range wireless communication standard, or infrared communication.

The wireless LAN communication section 660 is wirelessly connected with the wireless LAN terminal 200 which is provided in the LAN 500 of the image forming system 10.

The portable telephone network communication section 670 accesses the Internet 700 via the portable telephone network to access the image forming apparatus 100 via the Internet 700.

Figure 5:
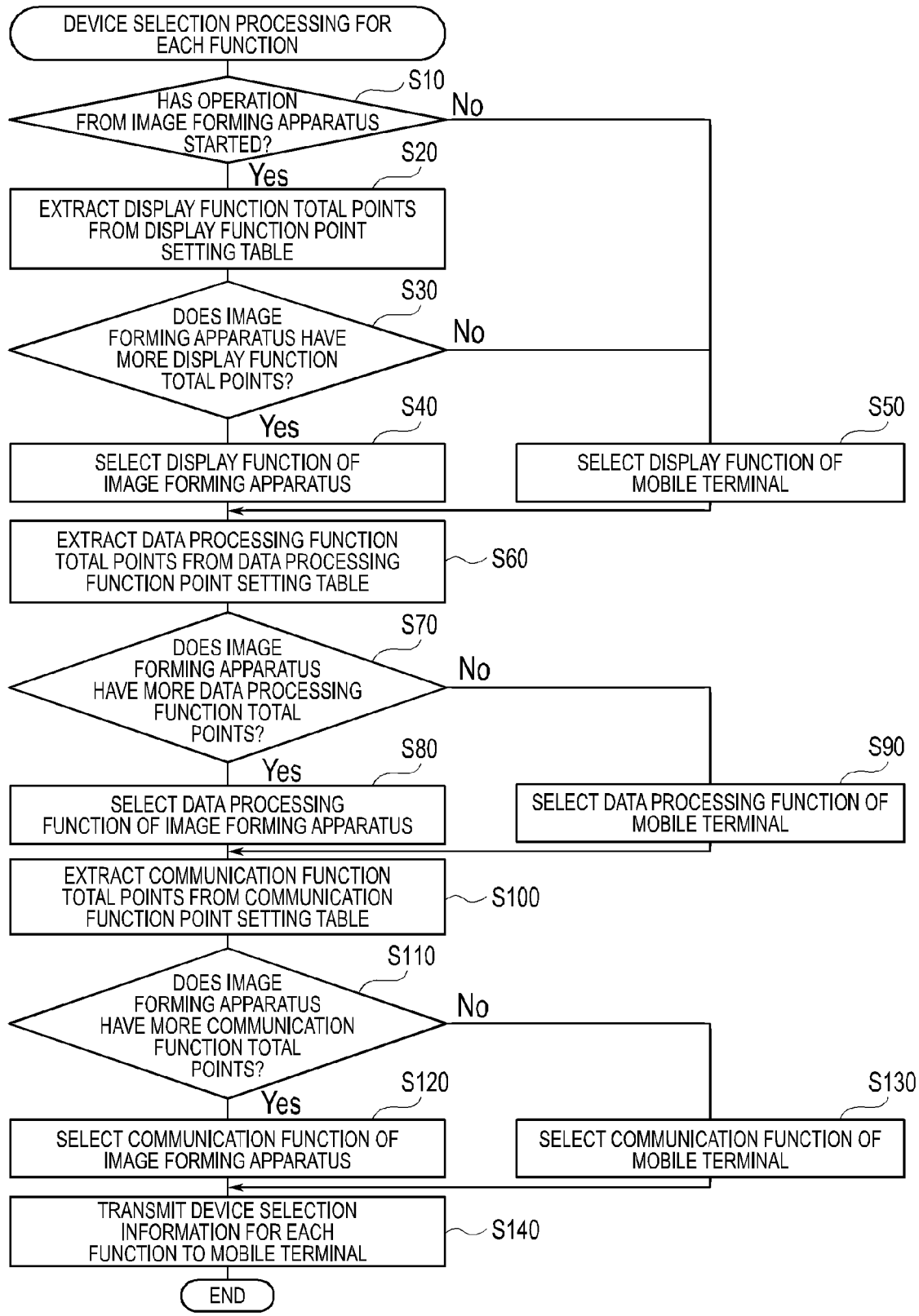
FIG. 5 is a flow chart illustrating a flow of device selection processing for each function according to the embodiment of the present disclosure.

Next, a flow of the device selection processing for each function which is performed by the device selection processing section 110*e* of the image forming apparatus 100 according to the embodiment of the present disclosure is illustrated in FIG. 5.

When the user performs the operation using the operation panel 140 of the image forming apparatus 100, the operation panel processing section 150 outputs an operation start notification to the device selection processing section 110*e*. The device selection processing section 110*e* of the image forming apparatus 100 starts the device selection processing for each function when the operation start notification is input thereto.

Further, when the user performs the operation using the operation panel 630 of the mobile terminal 600, the operation panel processing section 640 outputs the operation start notification to the control section 610. When the control section 610 of the mobile terminal 600 receives the operation start notification, the control section 610 transmits the operation start notification to the image forming apparatus 100 via the communication of any one of the short range wireless communication section 650, the wireless LAN communication section 660, and the portable telephone network communication section 670. When the short range wireless communication section 180 or the LAN interface section 190 of the image forming apparatus 100 receives the operation start notification from the mobile terminal 600, the short range wireless communication section 180 or the LAN interface section 190 outputs the operation start notification to the device selection processing section 110*e*. The device selection processing section 110*e* of the image forming apparatus 100 starts the device selection processing for each function when the operation start notification is input thereto.

Hereinafter, the device selection processing for each function illustrated in FIG. 5 will be described in step order.

(Step S10) First, in order to determine whether the operation start notification is performed by either the image forming apparatus 100 or the mobile terminal 600, the device selection processing section 110*e* determines whether the operation from the operation panel processing section 150 of the image forming apparatus 100 starts. When the operation from the operation panel processing section 150 starts (Yes in step S10), the process proceeds to Step S20. In addition, when the operation from the mobile terminal 600 starts (No in step S10), the process proceeds to step S50.

(Step S20) Next, in order to determine whether the display function of the image forming apparatus 100 or the mobile terminal 600 is selected, the device selection processing section 110*e* extracts the display function total points of the image forming apparatus 100 and the mobile terminal 600 from the display function point setting table 120*a* of the memory section 120.

(Step S30) Next, the device selection processing section 110*e* compares the display function total points of the image forming apparatus 100 and the mobile terminal 600 to determine whether the image forming apparatus 100 has more display function total points. If it is determined that the image forming apparatus 100 has more display function total points (Yes in step S30), the flow proceeds to step S40. In addition, if it is determined that the mobile terminal 600 has more display function total points (No in step S30), the flow proceeds to step S50.

(Step S40) Next, the device selection processing section 110*e* sets to select the display function of the image forming apparatus 100, such that the control section 110 performs the following display for the operation panel 140 by the display function of the image forming apparatus 100.

(Step S50) Next, the device selection processing section 110*e* sets to select the display function of the mobile terminal

600, such that the control section 110 does not perform the following display of the operation panel 140 by the display function of the image forming apparatus 100.

(Step S60) Next, in order to determine whether the data processing function of the image forming apparatus 100 or the mobile terminal 600 is selected, the device selection processing section 110e extracts the data processing function total points of the image forming apparatus 100 and the mobile terminal 600 from the data processing function point setting table 120b of the memory section 120.

(Step S70) Next, the device selection processing section 110e compares the data processing function total points of the image forming apparatus 100 and the mobile terminal 600 to determine whether the image forming apparatus 100 has more data processing function total points. If it is determined that the image forming apparatus 100 has more data processing function total points (Yes in step S70), the flow proceeds to step S80. In addition, if it is determined that the mobile terminal 600 has more data processing function total points (No in step S70), the flow proceeds to step S90.

(Step S80) Next, the device selection processing section 110e sets to select the data processing function of the image forming apparatus 100, such that the control section 110 performs the following data processing by the data processing function of the image forming apparatus 100.

(Step S90) Next, the device selection processing section 110e sets to select the data processing function of the mobile terminal 600, such that the control section 110 does not perform the following data processing by the data processing function of the image forming apparatus 100.

(Step S100) Next, in order to determine whether the communication function of the image forming apparatus 100 or the mobile terminal 600 is selected, the device selection processing section 110e extracts the communication function total points of the image forming apparatus 100 and the mobile terminal 600 from the communication function point setting table 120c of the memory section 120.

(Step S110) Next, the device selection processing section 110e compares the communication function total points of the image forming apparatus 100 and the mobile terminal 600 to determine whether the image forming apparatus 100 has more communication function total points. If it is determined that the image forming apparatus 100 has more communication function total points (Yes in step S110), the flow proceeds to step S120. In addition, if it is determined that the mobile terminal 600 has more communication function total points (No in step S110), the flow proceeds to step S130.

(Step S120) Next, the device selection processing section 110e sets to select the communication function of the image forming apparatus 100, such that the control section 110 performs the following communication by the communication function of the image forming apparatus 100.

(Step S130) Next, the device selection processing section 110e sets to select the communication function of the mobile terminal 600, such that the control section 110 does not perform the following communication by the communication function of the image forming apparatus 100.

(Step S140) Next, the device selection processing section 110e selects the communication unit of the short range wireless communication section 180 or the LAN interface section 190 to transmit information (hereinafter referred to as "device selection information for each function") on which the device selection processing section 110e selects the image forming apparatus 100 or the mobile terminal 600 to the display function, the data processing function, and the communication function to the mobile terminal 600. As the selection order of the communication units, the device selection processing section 110e may determine whether any communication unit can communicate based on the predetermined priority and use the communication unit determined to be communicable. The mobile terminal 600 receives the device selection information for each function to perform the processing of the functions selected by the mobile terminal 600 and not to perform the processing of the functions which are not selected by the mobile terminal 600.

Further, the each process by the display performance calculation section 110a, the data processing performance calculation section 110b, the communication performance calculation section 110c, and the function point transmission processing section 110d of the image forming apparatus 100 are performed at the predetermined period. And the each process by the display performance calculation section 610a, the data processing performance calculation section 610b, the communication performance calculation section 610c, and the function point transmission processing section 610d of the mobile terminal 600 are also performed at the predetermined period. Therefore, the display function point setting table 120a, the data processing function point setting table 120b, and the communication function point setting table 120c are set (hereinafter referred to as "dynamically set") to be updated at the predetermined period. However, points may be previously set in the display function point setting table 120a, the data processing function point setting table 120b, and the communication function point setting table 120c, and these tables are set (hereinafter referred to as "statically set") not to be updated. In addition, it may be designated whether these tables are dynamically set or statically set when the operation by the image forming apparatus 100 or the mobile terminal 600 starts.

Further, the image forming system 10 is configured to include one image forming apparatus 100, one mobile terminal 600, and one file server 400, respectively, but is not limited thereto and may be configured to include a plurality of units. When the image forming system 10 is configured to include the plurality of units, each of the image forming apparatus 100, the mobile terminal 600, and the file server 400 may be identified by attaching a name or a number thereto, such that the communication may be executed using the identification to perform the same processing as the embodiment. In addition, the file server 400 is connected with the LAN 500, but is not limited thereto and may be connected with, for example, the Internet 700. Further, instead of the file server 400, image forming system 10 may include a server to serve processes and data to image forming apparatus 100.

Further, the image forming system 10 of the present disclosure uses, as the function which is determined whether the mobile terminal 600 performs or not, the display function of the operation panel 140 of the image forming apparatus 100, the data processing function in the generation processing of data displayed on the operation screen, and the construction processing of the image preview, and the like, and the communication function of the image forming apparatus 100 with the file server 400 or the mobile terminal 600, but is not limited thereto and any other function may be used as long as the function belongs to the functions of the image forming apparatus 100 which may be included in the mobile terminal 600. The image forming system 10 of the present disclosure is configured so as to detect the performance of elements of the display function, the data processing function, and the communication function in the image forming apparatus 100 and the mobile terminal 600, calculate the points for each element and the total points thereof by the predetermined weighting, and determine the functions performed by the image forming apparatus 100 or the mobile terminal 600 based on the total points, but is not limited thereto. For example, it is possible to compare and determine the performance information of specific elements in each function. Further, the image forming apparatus 100 performs the determination on which of the image forming apparatus 100 or the mobile terminal 600 performs the processing of the functions, but it may be determined in the mobile terminal 600 side by transmitting the points for each element of the image forming apparatus 100 and the total points thereof to the mobile terminal 600. In this case, the image forming apparatus 100 includes a function point transmittance processing section 110ƒ illustrated by a dashed line in FIG. 2. The function point transmittance processing section 110ƒ extracts the points for each element from the display function point setting table 120a, the data processing function point setting table 120b, and the communication function point setting table 120c and the total points thereof and selects any one of the communication units of the short range wireless communication section 180 and the LAN interface section 190 to transmit the extracted points to the mobile terminal 600. In addition, the mobile terminal 600 includes a function selection section 610e (illustrated by a dashed line in FIG. 4) of the mobile terminal 600 side which compares the performance information of the specific element of each function of the image forming apparatus 100 and the mobile terminal 600 and selects the function for which the performance of the mobile terminal 600 is determined to be superior.

Further, the short range wireless communication section 650, the wireless LAN communication section 660, and the portable telephone network communication section 670 are an example of the function performance information receiving section of the mobile terminal in claims.

In addition, the short range wireless communication in the image forming apparatus 100 and the mobile terminal 600 is Bluetooth (registered trademark), which is a short range wireless communication standard, or infrared communication, but the present disclosure is not limited thereto. For example, a non-contact type IC card reader may be connected with the image forming apparatus 100 and the IC card reader communicate with the mobile terminal 600, thereby performing the short range wireless communication.

According to the image forming apparatus and the image forming system of the present disclosure, in the mobile terminal 600 including the function of the image forming apparatus 100, it is determined whether the processing of the functions of the image forming apparatus 100 are performed by the image forming apparatus 100 or the mobile terminal 600 for each function based on each performance. Cope with this, either the image forming apparatus or the mobile terminal having the improved convenience can perform the functions.

For example, in the image forming apparatus which can be simply operated by the mobile terminal, when two types of equipment of the panel mounted in the body of the image forming apparatus and the mobile terminal are present, it cannot be clearly shown which of the terminals improves operation performance or operation efficiency. Further, in each element of the display section, the data processing section, and the communication section which are elements required for the operations, in the case it cannot be determined whether any one of the body panel and the mobile terminal is superior, a technique of performing an operation by only one of the devices does not use usable hardware resources, which causes degradation in convenience. Compared with this, according to the embodiment of the present disclosure, when each function is performed, it is determined which of the image forming apparatus and the mobile terminal efficiently performs the functions, and the apparatus which can efficiently perform the functions can perform the functions. Therefore, the more superior hardware resources of the image forming apparatus or the mobile terminal can be used to improve the convenience.

Although the present disclosure is described with reference to the detailed embodiments, the embodiments are only an example of the present disclosure and therefore are not limited thereto.

The present disclosure is very suitable for the image forming apparatus but is not limited to the image forming apparatus and may be applied to general devices which may be operated by the mobile terminal.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus operated by a mobile terminal, comprising:
   a function performance information storage section which converts an individual performance value indicating performance of each of elements of hardware or software used at the time of realizing a function provided in the image forming apparatus into a point based on a predetermined weighting to the individual performance value and stores a total of all the converted points for the elements as function performance information representing performance of the function;
   a function performance information receiving section which receives a total of points into which respective individual performance values indicating performance of elements of hardware or software used at the time of realizing a function provided in the mobile terminal are converted as function performance information representing performance of the function from the mobile terminal; and
   a function selection section which compares the function performance information of the image forming apparatus with the function performance information of the mobile terminal to select the function for which the performance of the image forming apparatus is determined to be superior,
   wherein the image forming apparatus transmits the information representing the function which is not selected by the function selection section to the mobile terminal, and performs the processing of the function selected by the function selection section.

2. The image forming apparatus according to claim 1, wherein the function performance information storage section determines, based on an instruction from a user, whether to acquire and update the function performance information of the image forming apparatus at every predetermined period or not to update the function performance information.

3. The image forming apparatus according to claim 1, wherein the function performance information storage section stores the predetermined function performance information on each function provided in the image forming apparatus.

4. The image forming apparatus according to claim 1, wherein the function performance information receiving section receives the function performance information from the mobile terminal by short range wireless communication.

5. The image forming apparatus according to claim 1, wherein the function performance information receiving section receives the function performance information from the mobile terminal by wireless LAN communication.

6. The image forming apparatus according to claim 1, wherein the function performance information receiving section receives the function performance information from the mobile terminal via the Internet.

7. An image forming system including a mobile terminal and an image forming apparatus operated by the mobile terminal, wherein the mobile terminal comprises:

a function performance information storage section which converts an individual performance value indicating performance of each of elements of hardware or software used at the time of realizing a function provided in the mobile terminal into a point based on a predetermined weighting to the individual performance value and stores a total of all the converted points for the elements as function performance information representing performance of the function; and a function performance information transmitting section which transmits the function performance information stored in the function performance information storage section of the mobile terminal to the image forming apparatus, and the image forming apparatus comprises:

a function performance information storage section of the image forming apparatus which converts an individual performance value indicating performance of each of elements of hardware or software used at the time of realizing a function provided in the image forming apparatus into a point based on a predetermined weighting to the individual performance value and stores a total of all the converted points for the elements as function performance information representing performance of the function;

a function performance information receiving section which receives the function performance information of the mobile terminal from the mobile terminal; and a function selection section which compares the function performance information of the image forming apparatus with the function performance information of the mobile terminal to select the function for which the performance of the image forming apparatus is determined to be superior, wherein the image forming apparatus transmits information representing the function which is not selected by the function selection section to the mobile terminal, and performs the processing of the function selected by the function selection section.

\* \* \* \* \*